(12) United States Patent
Oguri et al.

(10) Patent No.: US 12,428,038 B2
(45) Date of Patent: Sep. 30, 2025

(54) VEHICLE

(71) Applicant: TOYOTA JIDOSHA KABUSHIKI KAISHA, Toyota (JP)

(72) Inventors: Haruki Oguri, Toyota (JP); Kenichi Yamada, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 33 days.

(21) Appl. No.: 18/613,439

(22) Filed: Mar. 22, 2024

(65) Prior Publication Data

US 2024/0351617 A1    Oct. 24, 2024

(30) Foreign Application Priority Data

Apr. 24, 2023   (JP) .................................. 2023-070999

(51) Int. Cl.
*B60W 50/00* (2006.01)
*B60W 60/00* (2020.01)

(52) U.S. Cl.
CPC ................................. *B60W 60/005* (2020.02)

(58) Field of Classification Search
CPC ........... B60W 60/005; B60W 60/0054; B60W 60/0053; B60W 2050/0006; B60Y 2304/076; B60K 35/00; B60R 16/023
See application file for complete search history.

(56) References Cited

U.S. PATENT DOCUMENTS

| 10,167,015 | B2 * | 1/2019 | Rust ...................... B60T 13/662 |
| 11,409,513 | B2 * | 8/2022 | John ................ G08G 1/096838 |
| 2019/0300008 | A1 | 10/2019 | Ando | |
| 2021/0247769 | A1 * | 8/2021 | Suzuki ................. G05D 1/0212 |

FOREIGN PATENT DOCUMENTS

JP    2019-177807 A    10/2019

* cited by examiner

*Primary Examiner* — Justin Holmes
(74) *Attorney, Agent, or Firm* — SoraIP, Inc.

(57) ABSTRACT

A vehicle includes: a vehicle platform configured to execute a plurality of predetermined functions of the vehicle; an autonomous driving kit that is configured to issue an instruction for autonomous driving and is attachable to and detachable from the vehicle platform; and a vehicle control interface box configured to communicate with the autonomous driving kit and issue a control instruction to the vehicle platform based on an instruction from the autonomous driving kit. A vehicle mode state indicating a state of the vehicle platform includes a manual mode under control of a driver of the vehicle, an autonomous driving mode under control of the autonomous driving kit, and a standby mode in which an operation on the vehicle platform by the driver is prohibited. The vehicle mode state is shifted to the standby mode when the vehicle platform is activated based on a control instruction from the autonomous driving kit.

5 Claims, 6 Drawing Sheets

VEHICLE

CROSS-REFERENCE TO RELATED APPLICATION

This application claims priority to Japanese Patent Application No. 2023-070999 filed on Apr. 24, 2023, incorporated herein by reference in its entirety.

BACKGROUND

1. Technical Field

The present disclosure relates to a vehicle, and more particularly, to a vehicle configured to execute autonomous driving.

2. Description of Related Art

There has been a system in which a vehicle and an information processing device cooperate to execute autonomous driving (see, for example, Japanese Unexamined Patent Application Publication No. 2019-177807 (JP 2019-177807 A)). In this system, the information processing device automatically generates control information by autonomous driving control software, and transmits the control information to the vehicle. The vehicle executes autonomous driving based on the received control information.

SUMMARY

In the system of JP 2019-177807 A, a Ready-ON state (Ignition-ON state) is established when the autonomous vehicle is started from the outside of the vehicle. Therefore, when a malicious person enters the driver's seat, the vehicle can be moved manually. Thus, there is a possibility that the vehicle may be stolen.

The present disclosure has been made to solve the above problem, and an object thereof is to provide a vehicle that can restrain theft of the vehicle.

A vehicle according to the present disclosure is configured to execute autonomous driving. The vehicle includes a vehicle platform configured to execute a plurality of predetermined functions of the vehicle, an autonomous driving kit that is configured to issue an instruction for the autonomous driving and is attachable to and detachable from the vehicle platform, and a vehicle control interface box configured to communicate with the autonomous driving kit and issue a control instruction to the vehicle platform based on an instruction from the autonomous driving kit. A vehicle mode state indicating a state of the vehicle platform includes a manual mode under control of a driver of the vehicle, an autonomous driving mode under control of the autonomous driving kit, and a standby mode in which an operation on the vehicle platform by the driver is prohibited. The vehicle mode state is shifted to the standby mode when the vehicle platform is activated based on a control instruction from the autonomous driving kit.

With such a configuration, when the vehicle platform is activated from the autonomous driving kit, the operation on the vehicle platform by the driver is prohibited. Therefore, a malicious driver cannot operate the vehicle platform. As a result, it is possible to provide the vehicle that can restrain theft of the vehicle.

When the vehicle platform is activated based on the control instruction from the autonomous driving kit, the vehicle mode state may be shifted from the manual mode to the standby mode after activation. With such a configuration, the vehicle mode state is shifted to the standby mode after the vehicle platform is activated. Therefore, theft of the vehicle can be prevented.

The vehicle mode state may be shifted from the standby mode to the autonomous driving mode under a condition that a request for shifting to the autonomous driving mode is received from the autonomous driving kit after shifting to the standby mode. With such a configuration, the vehicle mode state is shifted to the autonomous driving mode with no intermediation of the manual mode. Therefore, theft of the vehicle can be prevented.

When the vehicle platform is activated based on the control instruction from the autonomous driving kit, the vehicle mode state may be shifted from the manual mode to the standby mode after activation before a driving operation by the driver is enabled. With such a configuration, the vehicle mode state is shifted to the standby mode before the driving operation by the driver is enabled. Therefore, theft of the vehicle can be prevented.

The vehicle mode state may be set to the manual mode when the vehicle platform is activated by the driver. With such a configuration, when the vehicle platform is activated by the driver, the driver can drive the vehicle in the manual mode.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
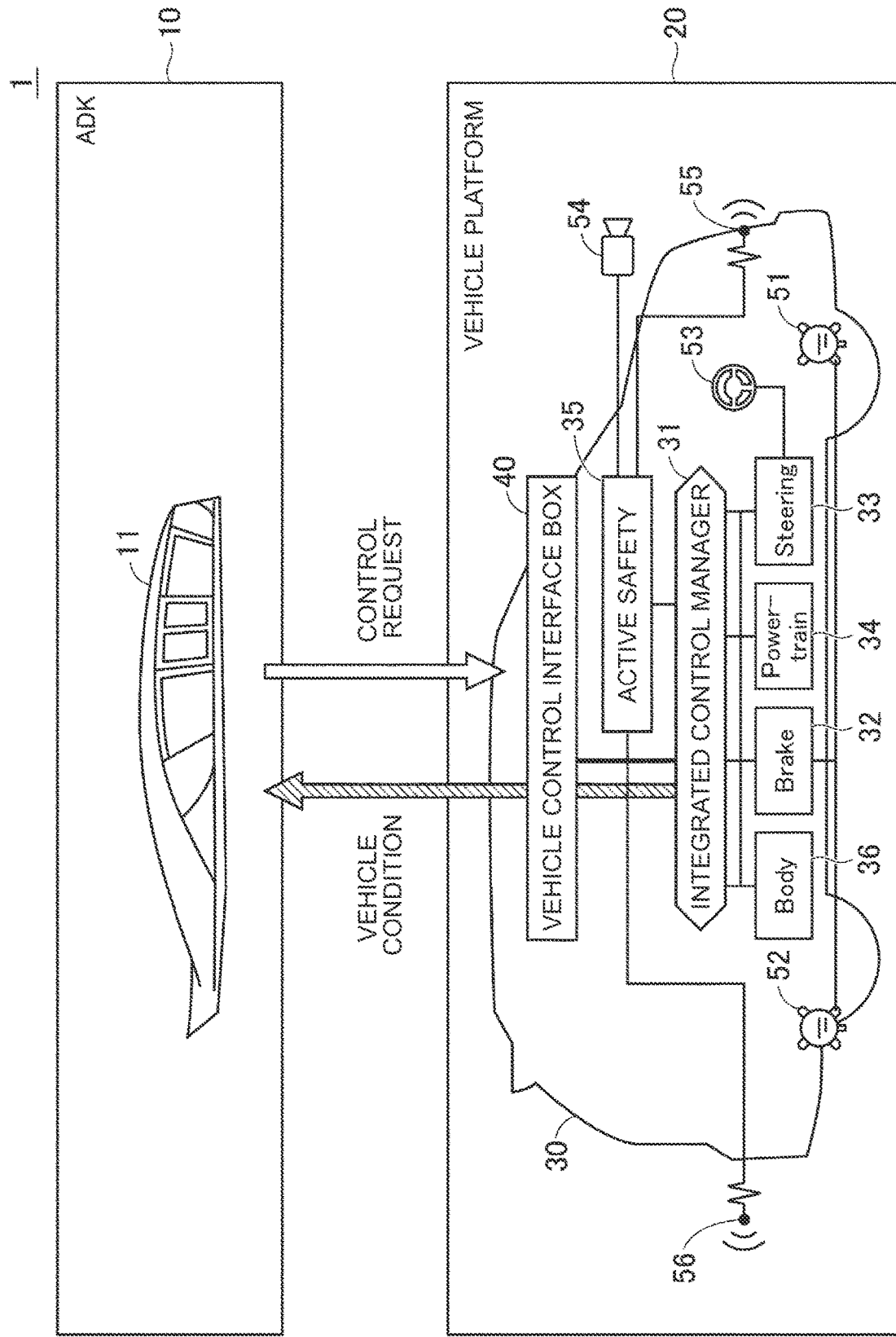
FIG. 1 is a diagram illustrating an outline of a vehicle according to an embodiment of the present disclosure.

FIG. 1 is a diagram illustrating an outline of a vehicle 1 according to an embodiment of the present disclosure. The vehicle 1 includes an Autonomous Driving Kit (ADK) 10 and a Vehicle Platform (VP) 20. ADK 10 is configured to be attachable to VP 20 (mountable to the vehicle 1). ADK 10 and VP 20 are configured to be able to communicate with each other via a vehicle-control interface (a VCIB 40 described later).

VP 20 can perform autonomous driving in accordance with control demands from ADK 10. In FIG. 1, although ADK 10 is shown at a position away from VP 20, ADK 10 is actually attached to a rooftop or the like of VP 20. ADK 10 can also be removed from VP 20. When ADK 10 is removed, VP 20 performs travel control (travel control according to user manipulation) in the manual mode.

ADK 10 includes an Autonomous Driving System (ADS) 11 for performing automated driving of the vehicle 1. ADS 11 creates a travel plan of the vehicle 1. ADS 11 outputs various control requests for causing the vehicle 1 to travel in accordance with the travel plan to VP 20 in accordance with an Application Program Interface (API) defined for each control request. ADS 11 receives various signals indicating the vehicle state (VP 20 state) from VP 20 according to an API defined for each signal. Then, ADS 11 reflects the condition of the vehicle in the travel plan.

VP 20 includes a base-vehicle 30 and a Vehicle Control Interface Box (VCIB) 40. The base vehicle 30 executes various types of vehicle control in accordance with control demands from ADK 10 (ADS 11). The base vehicle 30 includes various systems and various sensors for controlling the base vehicle 30. More specifically, the base vehicle 30 includes an integrated control manager 31, a brake system 32, a steering system 33, a powertrain system 34, an active safety system 35, a body system 36, wheel speed sensors 51 and 52, a pinion angle sensor 53, a camera 54, and radar sensors 55 and 56.

The integrated control manager 31 includes a processor and a memory, and integrates and controls the respective systems related to the operation of the vehicle 1.

The brake system 32 is configured to control a braking device provided on each wheel of the base vehicle 30. The wheel speed sensors 51 and 52 are connected to the brake system 32. The wheel speed sensors 51 and 52 detect the rotational speeds of the front and rear wheels of the base vehicle 30, respectively, and output the detected rotational speeds to the brake system 32. The brake system 32 outputs the rotational speed of the wheels to VCIB 40 as one of the information included in the vehicle state. In addition, the brake system 32 generates a braking command for the braking device in accordance with a predetermined control demand outputted from ADS 11 via VCIB 40 and the integrated control manager 31. The brake system 32 controls the braking device using the generated braking command.

The steering system 33 is configured to be able to control the steering angle of the steered wheels of the vehicle 1 by using a steering device. A pinion angle sensor 53 is connected to the steering system 33. The pinion angle sensor 53 detects a rotation angle (pinion angle) of the pinion gear connected to the rotation shaft of the actuator, and outputs the detected rotation angle to the steering system 33. The steering system 33 outputs the pinion angle to VCIB 40 as one of information included in the vehicle status. In addition, the steering system 33 generates a steering command for the steering device in accordance with a predetermined control request outputted from ADS 11 via VCIB 40 and the integrated control manager 31. The steering system 33 controls the steering device by using the generated steering command.

The powertrain system 34 controls an Electric Parking Brake (EPB) system 341 on at least one of a plurality of wheels, a P-Lock system 342 on a transmission, and a propulsion system 343 including a shifting device configured to select a shift range.

The active safety system 35 uses the camera 54 and the radar sensors 55 and 56 to detect obstacles (pedestrians, bicycles, parked vehicles, utility poles, and the like) in the front or rear. The active safety system 35 determines whether the vehicle 1 is likely to collide with an obstacle based on the distance between the vehicle 1 and the obstacle and the moving direction of the vehicle 1. When the active safety system 35 determines that there is a possibility of a collision, it outputs a braking command to the brake system 32 via the integrated control manager 31 so that the braking force increases.

The body system 36 is configured to control components (neither shown) such as a direction indicator, a horn, and a wiper according to, for example, a traveling state or an environment of the vehicle 1. The body system 36 controls the above-described components according to predetermined control requirements outputted from ADS 11 via VCIB 40 and the integrated control manager 31.

VCIB 40 is configured to be able to communicate with ADS 11 through Controller Area Network (CAN) or the like. VCIB 40 executes a predetermined API defined for each signal, and thereby receives various control requests from ADS 11 and outputs the vehicle status to ADS 11. When receiving the control request from ADK 10, VCIB 40 outputs a control command corresponding to the control request to the control command via the integrated control manager 31. VCIB 40 acquires various types of information of the base vehicle 30 from various systems via the integrated control manager 31, and outputs the state of the base vehicle 30 as a vehicle state to ADS 11.

Figure 2:
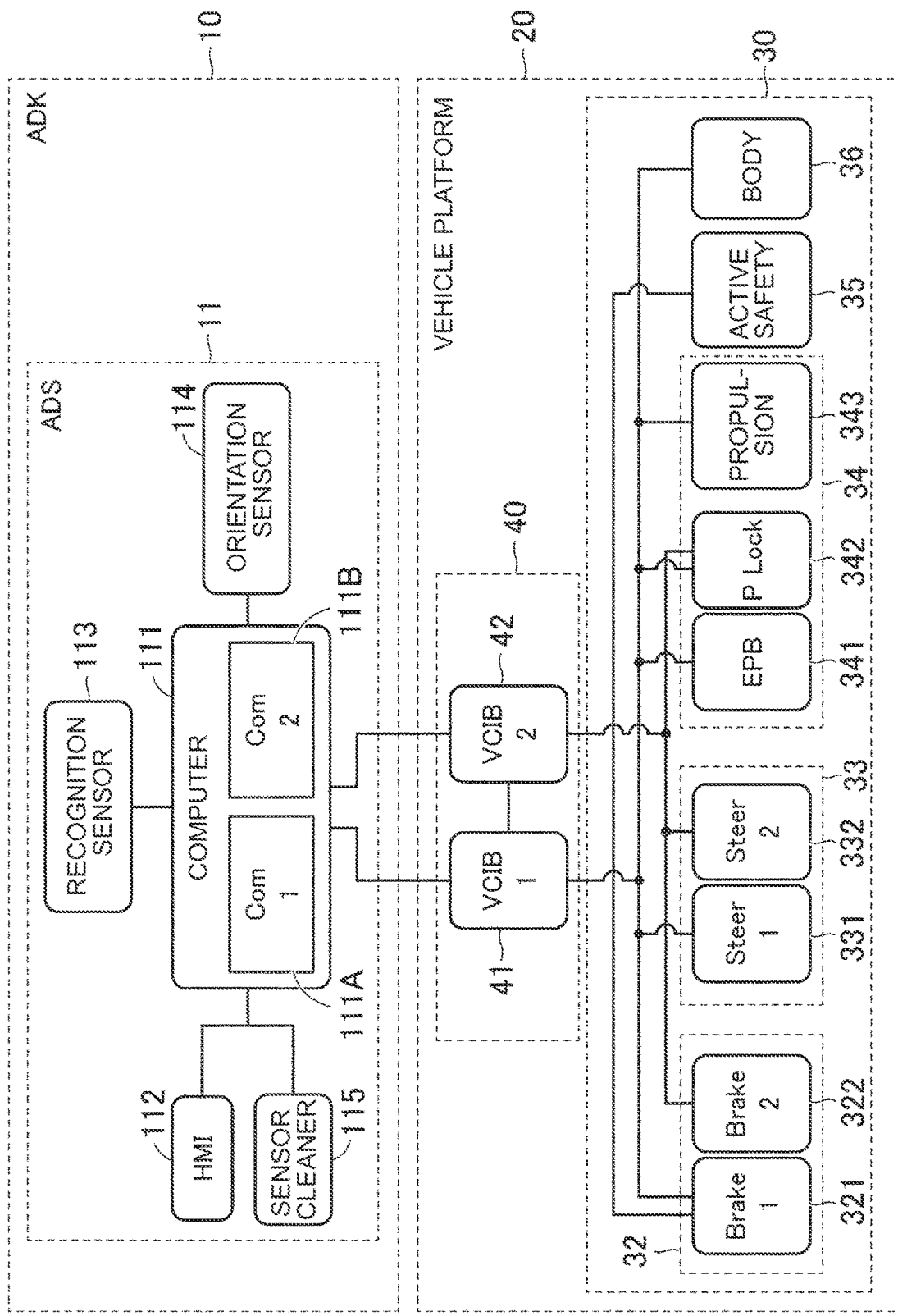
FIG. 2 is a more detailed view of the configuration of ADS, VCIB and VP.

FIG. 2 is a diagram illustrating a configuration of an ADS 11, VCIB 40 and a VP 20 in more detail. As illustrated in FIG. 2, ADS 11 includes a computer 111, a Human Machine Interface (HMI) 112, a recognition sensor 113, an attitude sensor 114, and a sensor cleaner 115. The computer 111 acquires the environment of the vehicle 1, the attitude, the behavior, and the position of the vehicle 1 using various sensors during the automated driving of the vehicle 1, and acquires the vehicle state from VP 20 through VCIB 40 to set a subsequent operation (acceleration, deceleration, bending, and the like) of the vehicle 1. The computer 111 outputs various commands for realizing the following operations to VCIB 40. The computer 111 includes communication modules 111A, 111B. Each of the communication modules 111A, 111B is configured to be capable of communicating with a VCIB 40.

HMI 112 presents information to the user or accepts a user operation at the time of autonomous driving, driving requiring a user operation, transitioning between autonomous driving and driving requiring a user operation, and the like. The recognition sensor 113 is a sensor for recognizing the environment of the vehicle 1, and includes at least one of a Laser Imaging Detection and Ranging (LIDAR), a millimeter-wave radar, and a camera. The attitude sensor 114 is a sensor for detecting the attitude, behavior, and position of the vehicle 1, and includes, for example, Inertial Measurement Unit (IMU) and Global Positioning System (GPS). The sensor cleaner 115 is configured to remove dirt adhering to the various sensors (a lens of a camera, an irradiation unit of a laser beam, or the like) while the vehicle 1 is traveling by using a cleaning liquid, a wiper, or the like.

VCIB 40 includes a main VCIB 41 and a sub-part VCIB 42. Each of VCIB 41, 42 includes a processor such as Central Processing Unit (CPU) and memories such as Read Only Memory (ROM) and Random Access Memory (RAM). The memory stores a program executable by the processor. VCIB 41 and the communication module 111A are communicably connected to each other. VCIB 42 and the communication module 111B are communicably connected to each other. Further, VCIB 41 and VCIB 42 are communicably connected to each other.

Each of VCIB 41, 42 relays control requirements and vehicle-information between ADS 11 and VP 20. More specifically, VCIB 41 uses API to generate a control command from a control demand from ADS 11. Then, VCIB 41 outputs the generated control command to the corresponding system among the plurality of systems included in VP 20. VCIB 41 uses API to generate information indicating the vehicle status from the vehicle information from the respective systems of VP 20. VCIB 41 outputs the generated information indicating the vehicle-state to ADS 11. The same applies to VCIB 42.

EPB device 341 controls EPB according to a control request outputted from ADS 11 via VCIB 41. EPB is provided separately from the braking device (e.g., disc brake system) and fixes the wheels by operation of the actuator. The P-Lock system 342 controls the P-Lock device according to a control request output from ADS 11 via VCIB 41. P-Lock device fixes the rotation of the output shaft of the transmission and fixes the wheels. The propulsion system 343 switches a shift range of the shifting device and controls a driving force from a driving source (motor generator, engine, or the like) in accordance with a control request outputted from ADS 11 via VCIB 41.

In the vehicle 1, the autonomous driving is executed when an autonomous driving mode, which will be described later, is selected in response to a request from ADK 10. During autonomous driving, ADS 11 first creates a travel plan. Examples of the travel plan include a plan for continuing straight travel, a plan for turning left/right at a predetermined intersection in the middle of a predetermined travel route, a plan for changing a travel lane, and the like. ADS 11 calculates a control physical quantity (acceleration, deceleration, tire-out angle, and the like) required for the vehicle 1 to operate in accordance with the created travel plan. ADS 11 divides the physical quantity for each API run cycle. ADS 11 uses API to provide control demands to VCIB 40 that represent the divided physical quantities. Further, ADS 11 acquires a vehicle state (an actual moving direction of the vehicle 1, a state of fixing of the vehicle, and the like) from VP 20, and re-creates a travel plan reflecting the acquired vehicle state. In this way, ADS 11 enables automated driving of the vehicle 1.

Figure 3:
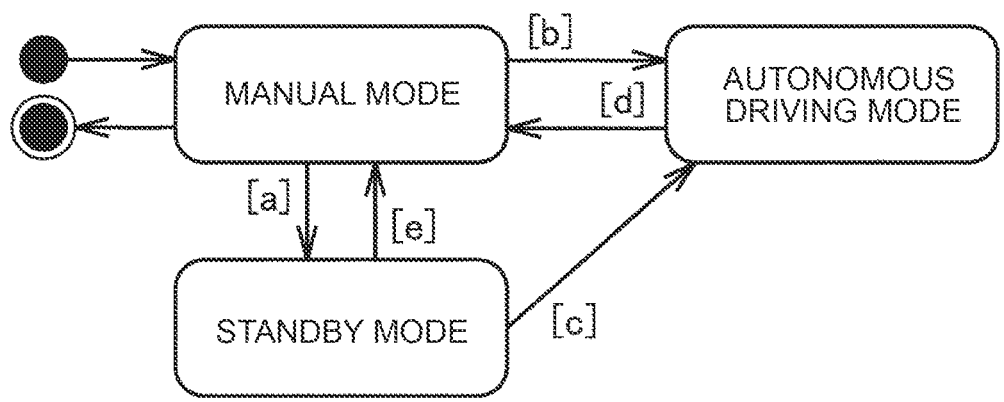
FIG. 3 is a state transition diagram illustrating a transition in the vehicle mode.

FIG. 3 is a state transition diagram illustrating a transition in the vehicle mode. In this instance, the vehicle 1 has a Manual Mode, an Autonomous Mode, and a Standby Mode as vehicle modes.

The manual mode is a mode similar to a vehicle that does not support autonomous driving, that is, a mode in which VP 20 is controlled by the driver. In the manual mode, ADK 10 is basically unable to control VP 20 except for some requirements.

The standby mode is a mode in which ADK 10 is successfully authenticated and the vehicle is prohibited from being moved by human driving. In the standby mode, ADK 10 cannot control VP 20 until it is switched to the autonomous driving mode.

The autonomous driving mode is a mode in which VP 20 is under the control of ADK 10 and the autonomous driving of the vehicle 1 is enabled. In the autonomous driving mode, ADK 10 can communicate with VP 20 after VCIB 40 has successfully authenticated ADK 10. In autonomous driving mode, VP 20 is under the control of ADK 10 as a consequence of Request for Autonomy being issued from ADK 10 as a vehicle mode demand (described below).

In the manual mode, Power mode status is "Wake" or "Driving Mode". vehicle mode state is "manual mode". In the standby mode, the power mode state is the "driving mode". The vehicle mode state is the "standby mode". In the autonomous driving mode, the power supply mode state is the "driving mode". The vehicle mode state is the "autonomous driving mode".

Figure 4:
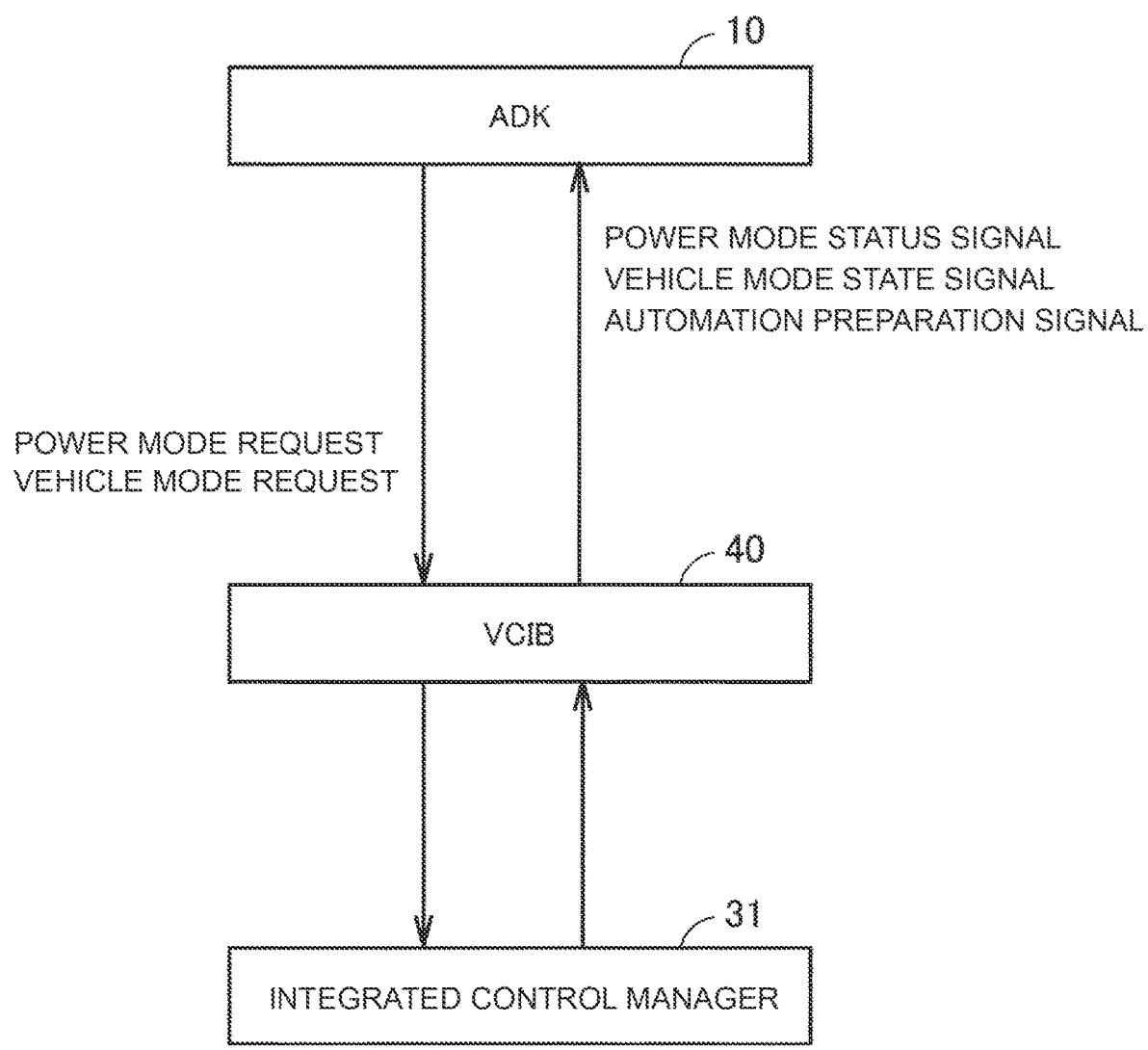
FIG. 4 is a diagram illustrating a transmission direction of various signals or commands related to transitions between modes.

FIG. 4 is a diagram illustrating a transmission direction of various signals or commands (requests) related to transitions between modes. Upon mode-transition, VCIB 40 receives Power mode command and Vehicle Mode Command from ADK 10 (ADS 11). VCIB 40 also provides a power mode status signal, a vehicle mode state signal, and a Readiness for autonomization) to ADK 10.

The power mode request is a request for controlling the power mode of VP 20. The power mode state signal is a signal indicating the present state of the power mode of VP 20. In the vehicle 1, by transmitting a power mode demand from ADS 11 to VCIB 40 in accordance with a predetermined API, it is possible to control the power mode of VP 20 from ADS 11. VP 20 according to this embodiment has two power supply modes, a Wake and a Driving Mode, as power supply modes.

The wake mode is a condition in which VCIB 40 is activated by power supplied from an auxiliary battery in the vehicle. In the wake mode, there is no power supply from the main engine battery, and ECU other than VCIB 40 are not activated except for a part of the body system ECU of the body system 36 (for example, a verification ECU for checking a smart-key, a body ECU for controlling locking/unlocking of a door, and the like).

The driving mode is a state in which the power of VP 20 is on (a state in which the power of the vehicles is on). In the driving mode, power is supplied from the main battery, VCIB 40 and the base-vehicle 30 are activated, and VP 20 is ready to travel.

The power mode request may take any of the values 0, 2, 6 in the argument. A value of 0 is set when ADS 11 does not request VP 20 power mode. If VCIB 40 receives a power mode demand with a value-0 set, VP 20 maintains the power mode at that time. Value-2 is set when requesting a wake mode from ADS 11. A power-mode request with a value-2 is required to activate VCIB 40. When VCIB 40 receives a power mode demand with a value-2 set, VP 20 power mode transitions to wake mode, and VCIB 40 is activated by receiving power from the auxiliary battery. The value 6 is set when the driving mode is requested from ADS 11. A power-mode request with a setting of 6 requires activation of VP 20. When VCIB 40 receives a power mode request for which the value-6 is set, the power mode of VP 20 transitions to the driving mode, and VP 20 is powered on.

In the vehicle 1, a signal indicating the state of the power supply mode is transmitted from VCIB 40 to ADS 11 in accordance with a predetermined API, whereby the state of the power supply mode of VP 20 is notified to ADS 11. The power-mode status signal sent to ADS 11 may take either of the values 2 or 6. The value 2 is set when the power mode is the wake mode. The value 6 is set when the power supply mode is the driving mode.

In the vehicle 1, by transmitting a vehicle mode demand from ADS 11 to VCIB 40 in accordance with a predetermined API, the vehicle mode of VP 20 can be controlled from ADS 11. The vehicle mode request may take any of the values 0 to 2 in the argument. A value of 0 is set when ADS 11 does not request VP 20 vehicle-mode. If VCIB 40 receives a vehicle mode demand with a value-0 set, the vehicle mode at that time is maintained.

Value-1 is set when the autonomous driving mode is requested from ADS 11 (Request For Autonomy). That is, the vehicle mode request for which the value 1 is set requests the transition from the manual mode of the vehicle mode to the autonomous driving mode. Value-2 is set when a manual mode is requested from ADS 11 (Deactivation Request). That is, the vehicle mode request for which the value 2 is set requests the transition from the autonomous driving mode of the vehicle mode to the manual mode.

In the vehicle 1, by transmitting a signal indicating the state of the vehicle mode from VCIB 40 to ADS 11 according to a predetermined API, the state of the vehicle mode of VP 20 is notified to ADS 11. The vehicle mode state signal may take any of the values 0 to 2 in the argument. The value 0 is set when the vehicle mode is the manual mode. The value 1 is set when the vehicle mode is the autonomous driving mode. The value 2 is set when the vehicle mode is the standby mode. When VP 20 is activated (the power mode is the wake mode or the driving mode), the vehicle mode starts from the manual mode. That is, the initial state of the vehicle mode is set to "manual mode".

In the vehicle 1, according to a predetermined API, VCIB 40 transmits, to ADS 11, a signal indicating a ready state of automation of VP 20, thereby notifying ADS 11 of whether or not VP 20 can be shifted to the autonomous driving mode. The automation preparation signal may take any of the values 0, 1, 3 in the argument. A value of 0 is set when the autonomous driving mode is not ready (Not Ready For Autonomous Mode). Value-1 is set when the autonomous driving mode is ready (Ready For Autonomous Mode). The value 3 is set if the state has not yet been determined. Value-3 means Invalid.

Referring again to FIG. 3, the transition between modes will be described in detail. The transition a indicates a transition from the manual mode to the standby mode. In the manual mode, when the first condition is satisfied, the vehicle mode transitions from the manual mode to the standby mode. The first condition includes five conditions (1) to (5) below, and is satisfied when all five conditions are satisfied, and is not satisfied when any one of the five conditions is not satisfied.

(1) ADK 10 is authenticated by VCIB 40. (2) Condition that the latest power mode request of the reception history is "driving mode". (3) Condition that the power mode status signal is "driving mode". (4) Conditions that VP 20 is good. (5) The condition that there is no input from the driver.

The transition b indicates a transition from the manual mode to the autonomous driving mode. The transition c indicates a transition from the standby mode to the autonomous driving mode. In the manual mode and the standby mode, when the second condition is satisfied, the vehicle mode transitions from the manual mode and the standby mode to the autonomous driving mode, respectively. The second condition includes the following conditions (1) to (4), and is satisfied when all four conditions are satisfied, and is not satisfied when any one of the four conditions is not satisfied.

(1) ADK 10 is authenticated by VCIB 40. (2) Condition that the power mode status signal is "driving mode". (3) Condition that the automation preparation signal is "ready for autonomous driving mode". (4) The condition that the vehicle mode request is an "automatic request".

The transition d indicates a transition from the autonomous driving mode to the manual mode. In the autonomous driving mode, when the third condition that the vehicle mode request is "deactivation request" is satisfied, the vehicle mode transitions from the autonomous driving mode to the manual mode.

The transition e indicates a transition from the standby mode to the manual mode. In the standby mode, when the fourth condition that the vehicle mode request is "deactivation request" is satisfied, the vehicle mode transitions from the standby mode to the manual mode.

Figure 5:
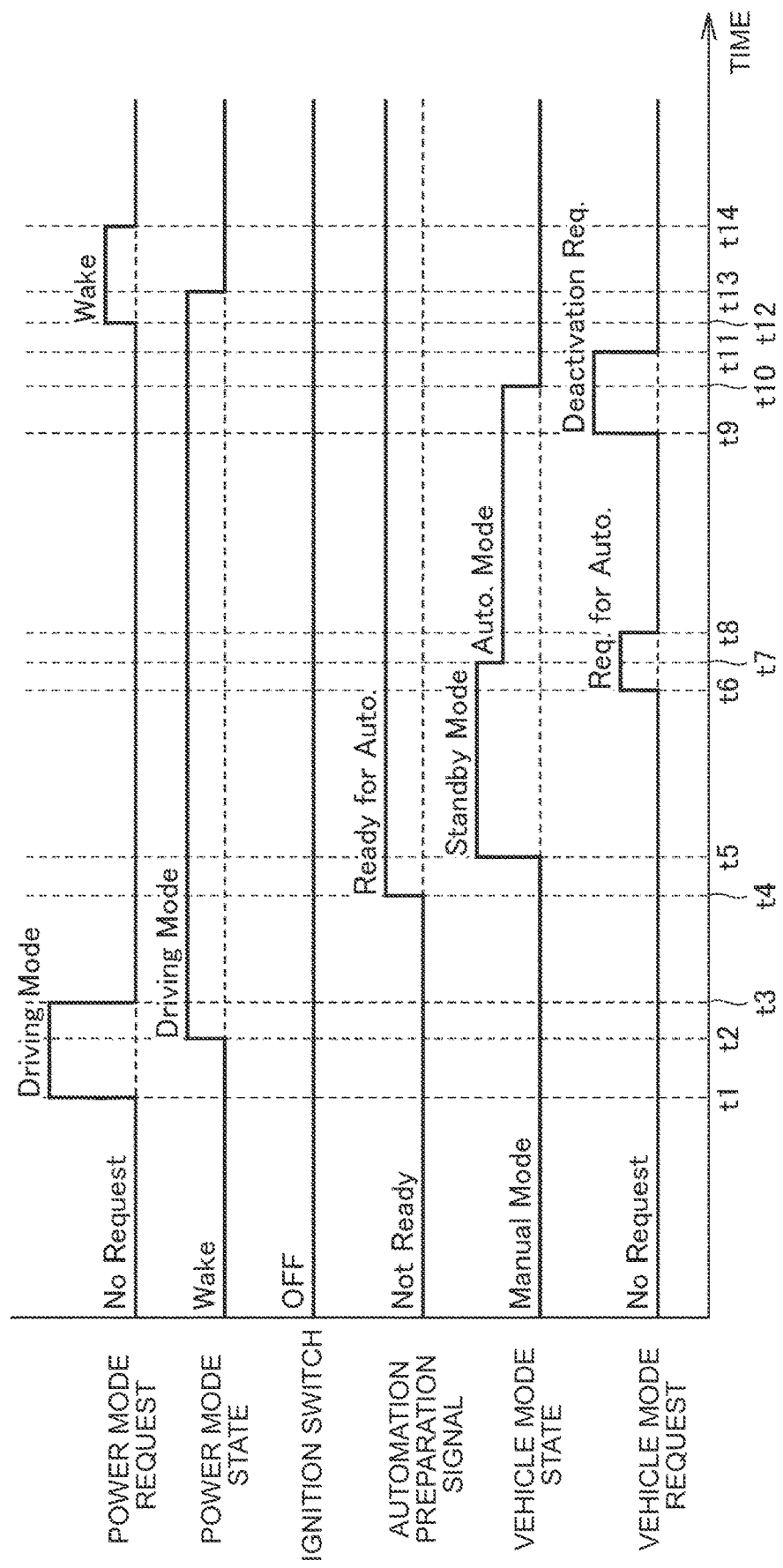
FIG. 5 is a diagram showing timing charts when ADK turns on vehicles.

FIG. 5 is a diagram illustrating a timing chart when ADK 10 turns on the vehicle 1. Since ADK 10 is when the vehicle 1 is turned on, the signal from the ignition switch remains OFF. When VP 20 is powered on in response to an instruction from ADK 10, the vehicle mode is set to the "manual mode". During the period from the time t1 to the time t3, when a power mode request of a value-6 requesting the "driving mode" is transmitted from ADK 10 to VCIB 40, the power mode is switched from the "wake mode" to the "driving mode" t2 the time period from the time t1 to the time t3. After the time t2, VCIB 40 transmits, to ADK 10, a power mode status signal of 6 indicating that the driving mode is selected.

After the power supply mode is set to the driving mode, when the preparation of the autonomous driving mode is completed t4 the time, the automation preparation signal transmitted from VCIB 40 to ADK 10 is switched from the value 0 indicating "not ready" to the value 1 indicating "automatic operation ready". Thereafter, at time t5, the vehicle mode state signal transmitted from VCIB 40 to ADK 10 is switched from the value 0 indicating the "manual mode" to the value 2 indicating the "standby mode".

When the vehicle mode request transmitted from ADK 10 to VCIB 40 is switched from the value 0 indicating "no request" to the value 1 indicating "automatic request" at the time t6 when the vehicle mode is in the "standby mode", the vehicle mode state signal transmitted from VCIB 40 to ADK 10 is switched from the value 2 indicating the "standby mode" to the value 1 indicating the "autonomous driving mode" at the time t7 preceding the time t8 which is returned to the value 0 indicating "no request". As a result, autonomous driving of the vehicle 1 (VP 20) is started according to an instruction from ADK 10.

When the vehicle mode request transmitted from ADK 10 to VCIB 40 is switched from the value 0 indicating "no request" to the value 2 indicating "no deactivation request" at the time t9 when the vehicle mode is in the "autonomous driving mode", the vehicle mode state signal transmitted from VCIB 40 to ADK 10 is switched from the value 1 indicating the "autonomous driving mode" to the value 0 indicating the "manual mode" at the time t10 preceding the time t11 which is returned to the value 0 indicating "no request". This allows the driver to manually drive the vehicle 1 (VP 20).

When a power mode request of a value 2 requesting a "wake mode" is transmitted from t12 of time to t14 of time during which the power mode is the "driving mode", and the power mode is transmitted from ADK 10 to VCIB 40, the power mode is switched from the "driving mode" to the "wake mode" t13 the time between the time t12 and the time t14. After the time t13, VCIB 40 transmits, to ADK 10, a power-supply-mode status signal of a value-2 indicating that the power-supply mode is the "wake mode".

Figure 6:
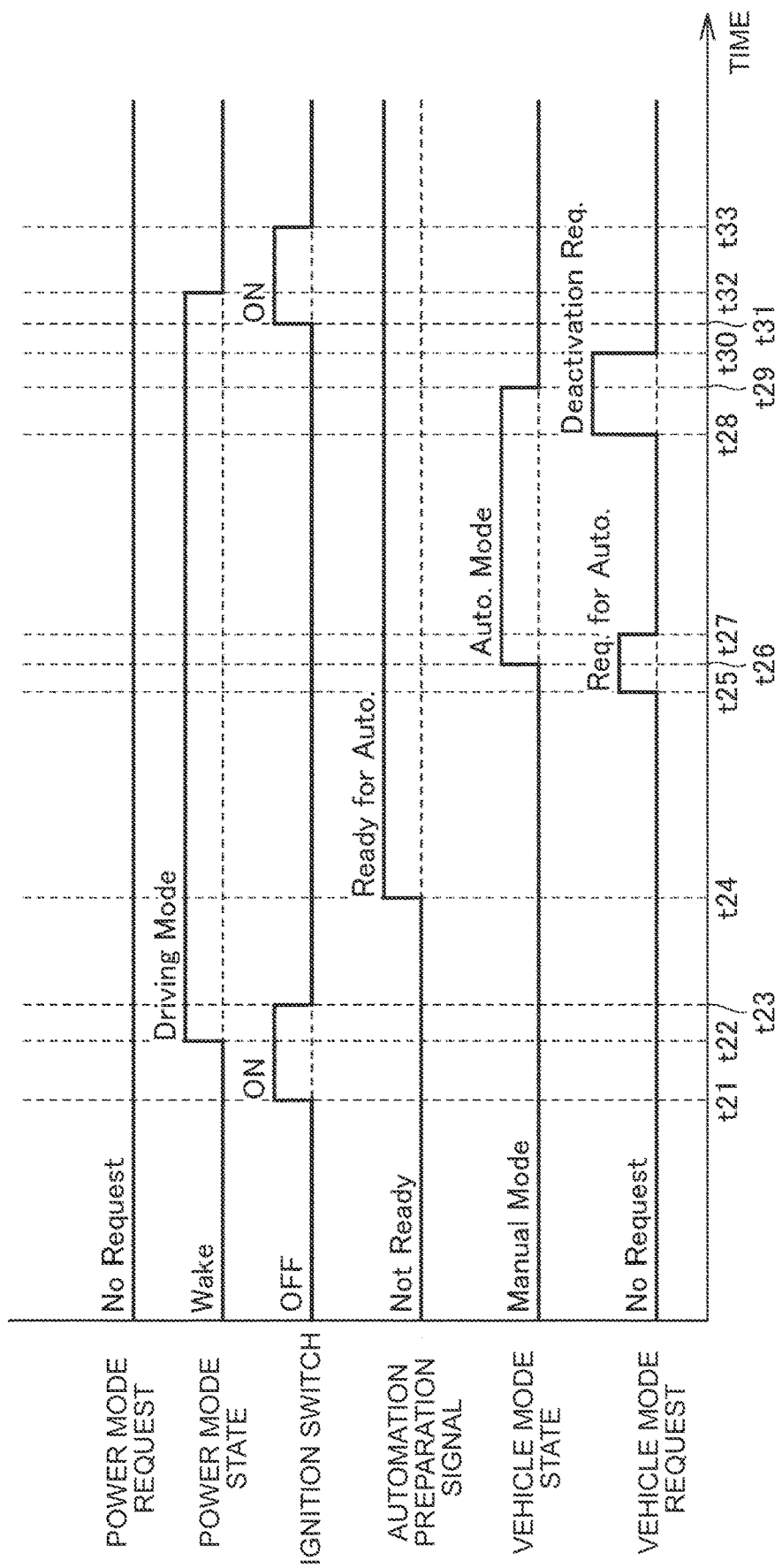
FIG. 6 is a diagram illustrating a timing chart when the driver turns on the vehicle.

FIG. 6 is a diagram illustrating a timing chart when the driver turns on the vehicle 1. Since it is the case where the driver turns on the vehicle 1, the power mode request remains at a value of 0 indicating "no request". When VP 20 is powered on in response to the driver's manipulation, the vehicle mode is set to the "manual mode". During the period from the time t21 to the time t23, when the ignition switch is pressed by the driver and the signal from the ignition switch is switched from OFF to ON, the power supply mode is switched from the "wake mode" to the "driving mode" in the time t22 between the time t21 and the time t23. This allows the driver to manually drive the vehicle 1 (VP 20). After the time t22, VCIB 40 transmits, to ADK 10, a power mode status signal of 6 indicating that the driving mode is selected.

After the power supply mode is set to the driving mode, when the preparation of the autonomous driving mode is completed t24 the time, the automation preparation signal transmitted from VCIB 40 to ADK 10 is switched from the value 0 indicating "not ready" to the value 1 indicating "automatic operation ready". Thereafter, when the vehicle mode request transmitted from ADK 10 to VCIB 40 is switched from the value 0 indicating "no request" to the value 1 indicating "automatic request" at the time t25 when the vehicle mode is in the "manual mode", the vehicle mode state signal transmitted from VCIB 40 to ADK 10 is switched from the value 0 indicating "manual mode" to the value 1 indicating "autonomous driving mode" at the time t26 preceding the time t27 which is returned to the value 0 indicating "no request". As a result, autonomous driving of the vehicle 1 (VP 20) is started according to an instruction from ADK 10.

When the vehicle mode request transmitted from ADK 10 to VCIB 40 is switched from the value 0 indicating "no request" to the value 2 indicating "no deactivation request" at the time t28 when the vehicle mode is in the "autonomous driving mode", the vehicle mode state signal transmitted from VCIB 40 to ADK 10 is switched from the value 1 indicating the "autonomous driving mode" to the value 0 indicating the "manual mode" at the time t29 preceding the time t30 which is returned to the value 0 indicating "no request". This allows the driver to manually drive the vehicle 1 (VP 20).

When the signal from the ignition switch is switched from OFF to ON by the driver pressing the ignition switch from the time t31 after the time t30 to the time t33 in which the power supply mode is the "driving mode", the power supply mode is switched from the "driving mode" to the "wake mode" in the time t32 from the time t31 to the time t33. After the time t32, VCIB 40 transmits, to ADK 10, a power-supply-mode status signal of a value-2 indicating that the power-supply mode is the "wake mode".

The embodiments disclosed herein should be considered to be exemplary and not restrictive in all respects. It is intended that the scope of the disclosure be defined by the appended claims rather than the description of the embodiments described above, and that all changes within the meaning and range of equivalency of the claims be embraced therein.

What is claimed is:

1. A vehicle configured to execute autonomous driving, the vehicle comprising:
    a vehicle platform configured to execute a plurality of predetermined functions of the vehicle;
    an autonomous driving kit that is configured to issue an instruction for the autonomous driving and is attachable to and detachable from the vehicle platform; and
    a vehicle control interface box configured to communicate with the autonomous driving kit and issue a control instruction to the vehicle platform based on an instruction from the autonomous driving kit, wherein:
    a vehicle mode state indicating a state of the vehicle platform includes a manual mode under control of a driver of the vehicle, an autonomous driving mode under control of the autonomous driving kit, and a standby mode in which an operation on the vehicle platform by the driver is prohibited; and
    the vehicle mode state is shifted to the standby mode when the vehicle platform is activated based on a control instruction from the autonomous driving kit.

2. The vehicle according to claim 1, wherein when the vehicle platform is activated based on the control instruction from the autonomous driving kit, the vehicle mode state is shifted from the manual mode to the standby mode after activation.

3. The vehicle according to claim 2, wherein the vehicle mode state is shifted from the standby mode to the autonomous driving mode under a condition that a request for shifting to the autonomous driving mode is received from the autonomous driving kit after shifting to the standby mode.

4. The vehicle according to claim 2, wherein when the vehicle platform is activated based on the control instruction from the autonomous driving kit, the vehicle mode state is shifted from the manual mode to the standby mode after activation before a driving operation by the driver is enabled.

5. The vehicle according to claim 1, wherein the vehicle mode state is set to the manual mode when the vehicle platform is activated by the driver.

\* \* \* \* \*